United States Patent
Tokoi et al.

(10) Patent No.: US 9,124,146 B2
(45) Date of Patent: Sep. 1, 2015

(54) AXIAL GAP ROTATING-ELECTRIC MACHINE

(71) Applicant: Hitachi, Ltd., Chiyoda-ku, Tokyo (JP)

(72) Inventors: Hirooki Tokoi, Tokai-mura (JP); Yuji Enomoto, Hitachi (JP); Shigeki Tounosu, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 214 days.

(21) Appl. No.: 13/951,124

(22) Filed: Jul. 25, 2013

(65) Prior Publication Data

US 2014/0042842 A1 Feb. 13, 2014

(30) Foreign Application Priority Data

Aug. 9, 2012 (JP) ................................. 2012-176862

(51) Int. Cl.
*H02K 9/00* (2006.01)
*H02K 9/08* (2006.01)
*H02K 21/24* (2006.01)
*H02K 9/06* (2006.01)

(52) U.S. Cl.
CPC .. *H02K 9/08* (2013.01); *H02K 9/06* (2013.01); *H02K 21/24* (2013.01)

(58) Field of Classification Search
USPC ......................... 310/52–59, 61–63, 60 A, 268
See application file for complete search history.

(56) References Cited

U.S. PATENT DOCUMENTS

| | | | | |
|---|---|---|---|---|
| 3,942,863 A | * | 3/1976 | Schuwerk | 359/508 |
| 4,510,409 A | * | 4/1985 | Kanayama | 310/268 |
| 4,554,472 A | * | 11/1985 | Kumatani | 310/62 |
| 5,670,835 A | * | 9/1997 | Muller et al. | 310/58 |
| 5,892,307 A | * | 4/1999 | Pavlovich et al. | 310/68 B |
| 6,028,369 A | * | 2/2000 | Hirose et al. | 290/1 A |
| 7,109,629 B2 | * | 9/2006 | Al-Khayat et al. | 310/261.1 |
| 2009/0146512 A1 | * | 6/2009 | Yoshizawa et al. | 310/53 |
| 2009/0267426 A1 | * | 10/2009 | Graner et al. | 310/54 |
| 2012/0169161 A1 | * | 7/2012 | Woo | 310/59 |

FOREIGN PATENT DOCUMENTS

| | | |
|---|---|---|
| JP | 2006-217773 A | 8/2006 |
| JP | 2006-307748 A | 11/2006 |
| JP | 2009-142095 A | 6/2009 |

* cited by examiner

*Primary Examiner* — Thanh Lam
(74) *Attorney, Agent, or Firm* — Crowell & Moring LLP

(57) ABSTRACT

A channel connecting a first opening formed on one side surface of a rotor and a second opening formed on the other side surface of the rotor is provided, and a first distance from a rotating shaft to the center of the first opening and a second distance from the rotating shaft to the center of the second opening are differentiated. A differential pressure is generated between the first opening and the second opening provided in the rotor by the differentiating the distances from the center of the rotating shaft to the first opening and the second opening, a flow of air is generated by the differential pressure from one surface or the other surface of the rotor to the other surface or the one surface, whereby the stator in proximity to the rotor may be cooled.

20 Claims, 5 Drawing Sheets

AXIAL GAP ROTATING-ELECTRIC MACHINE

CLAIM OF PRIORITY

The present application claims priority from Japanese Patent applications serial No. 2012-176862, filed on Aug. 9, 2012, the respective contents of which are hereby incorporated by reference into this application.

TECHNICAL FIELD

The present invention relates to an axial gap rotating-electric machine and, more specifically, to an axial gap rotating-electric machine configured to cool heat generating portions by using air in the interior of the rotating-electric machine.

DESCRIPTION OF THE RELATED ART

Rotating-electric machines such as motors are used in a variety of industrial fields, and are required to cool the rotating-electric machine by efficiently radiating heat generated by the rotating-electric machine to the outside. Therefore, a number of cooling methods are proposed. However, such methods may require changes in structure of the rotating-electric machine, and hence characteristics of the rotating-electric machine such as the efficiency or the physical structure of the rotating-electric machine, or service lives of the components such as bearings or insulating materials may be affected.

In general, it is known that major part of loss of the rotating-electric machine is generated as heat at a winding coil and an iron core which constitute an electromagnet. Therefore, the entire part of the rotating-electric machine is effectively cooled by cooling a stator to which the electromagnet is assembled.

The rotating-electric machine as a subject of the invention is an axial gap rotating-electric machine. The axial gap rotating-electric machine is a rotating-electric machine composed of a disk-shaped rotor and a stator arranged so as to face thereto.

The rotor of the axial gap rotating-electric machine includes a plurality of flat-plate shaped permanent magnets in the circumferential direction, and the stator includes a plurality of electromagnets composed of an iron core and a winding coil arranged in the circumferential direction. The rotor is fixedly coupled to a rotating shaft, and the rotating shaft is held by an end bracket via a bearing. The stator is fixed and held in a housing on the outer peripheral side.

Then, the axial gap rotating-electric machine has a gap surface area proportional to the square of a radius of the rotor. Therefore, when compared with the same physical structures, the more the shape is flat, the more efficiently a rotational torque is obtained.

Therefore, there are rotating-electric machines configured to be capable of obtaining a rotational torque effectively by increasing the gap surface areas per physical structure by employing configurations such as a one-rotor two-stator axial gap rotating-electric machine including one rotor interposed between two stators, and two gap surfaces formed on both sides of the rotor, or a two-rotor one-stator axial gap rotating-electric machine including one stator interposed between two rotors, and two gap surfaces formed on both sides of the stator.

Furthermore, in the axial gap rotating-electric machines in such configurations, the housing and the end bracket are coupled to each other and hence provide substantially a hermetically sealed state, and the rotors and stators are stored in this hermetically sealed space.

In the axial gap rotating-electric machine hermetically sealed in this manner, methods of thermal radiation of heat generated by the stator mainly including the electromagnets include (1) transferring to the housing on the basis of thermal conduction through the medium of the winding coil, the iron core, a resin surrounding the winding coil and the iron core of the stator, and a resin or the like for fixing the stator to the housing, and (2) transferring to the housing, the rotor, and the rotating shaft by thermal transfer through the medium of air existing in a space surrounded by the end bracket and the housing (hereinafter, referred to as "internal air") as representatives.

The heat propagated to the housing, the rotor, and the rotating shaft which constitute the axial gap rotating-electric machine in such routes is radiated to external air by thermal transfer or thermal radiation through the contact with the external air having a lower temperature.

For example, a compressor used for air conditioners or freezing machines is disclosed in JP-A-2006-307748. In this compressor, the axial gap rotating-electric machine is used for compressing cooling medium and, in this axial gap rotating-electric machine, a configuration in which a cooling medium is flowed through a communication channel provided in the rotor is disclosed.

A number of proposals have been presented for the method of cooling the stator in the related art. In JP-A-2006-307748 described above, a technology in which a ventilation groove communicating from a compressor side to the opposite side is provided in the interior of the rotating-electric machine for the purpose of reduction of the pressure loss of the compressor is proposed. This technology is directed for a one-rotor one-stator axial gap rotating-electric machine in which one rotor and one stator face each other.

Specifically, a compression mechanism connected to the rotating shaft is arranged on one surface of the stator (the surface where the rotor is not arranged so as to face thereto), the communication channel is provided in an inner periphery of the stator so as to communicate from one surface to the other surface (the surface where the rotor is arranged so as to face thereto), the communication channel is provided in an inner periphery of the rotor so as to communicate from one surface to the other surface, and the cooling medium used in the compressor is forcedly introduced.

As another method, there is proposed a method of cooling the axial gap rotating-electric machine by providing a vent hole communicating a positive pressure side and a negative pressure side of a fan. Specifically, a fan boss for storing the rotor and the stator is provided on the outside of the rotor, and a fan blade configured to form an air flow in the direction of the axis of rotation in association with the rotation of the fan boss is provided. Then, the external air is forcedly flowed into the interior of the fan boss by the fan blade, so that the interior of the axial gap rotating-electric machine is cooled.

All these cooling methods described above are configured to forcedly pass the cooling medium or the external air into the interior of the stator, and have a problem that the structure becomes complicated if these methods are applied to totally enclosed rotating-electric machine in which the rotor and the stator are covered with the housing and the end bracket.

SUMMARY

It is an object of the invention to provide an axial gap rotating-electric machine capable of cooling a stator by flowing internal air existing in a space hermetically sealed by a housing and an end bracket to the stator efficiently in a simple structure.

A characteristic of the invention is that a communication channel connecting a first opening formed on one side surface of a rotor and a second opening formed on the other side surface of the rotor is provided, and a first distance from a rotating shaft to the first opening and a second distance from the rotating shaft to the second opening are differentiated.

According to the invention, a differential pressure is generated between the first opening and the second opening provided in the rotor by differentiating the distances from the rotating shaft to the first opening and the second opening, and an air flow is generated by the differential pressure via the communication channel from one surface or the other surface of the rotor to the other surface or the one surface, whereby a stator in proximity to the rotor may be cooled.

Therefore, even though the axial gap rotating-electric machine is of a hermetically closed type, cooling of the stator is achieved with a simple configuration such as forming the communication channel in the rotor. The internal air having used for cooling the stator is subject to a thermal exchange with the external air via the housing, and a circulative cooling is enabled.

DESCRIPTION OF THE PREFERRED EMBODIMENTS

Figure 1:
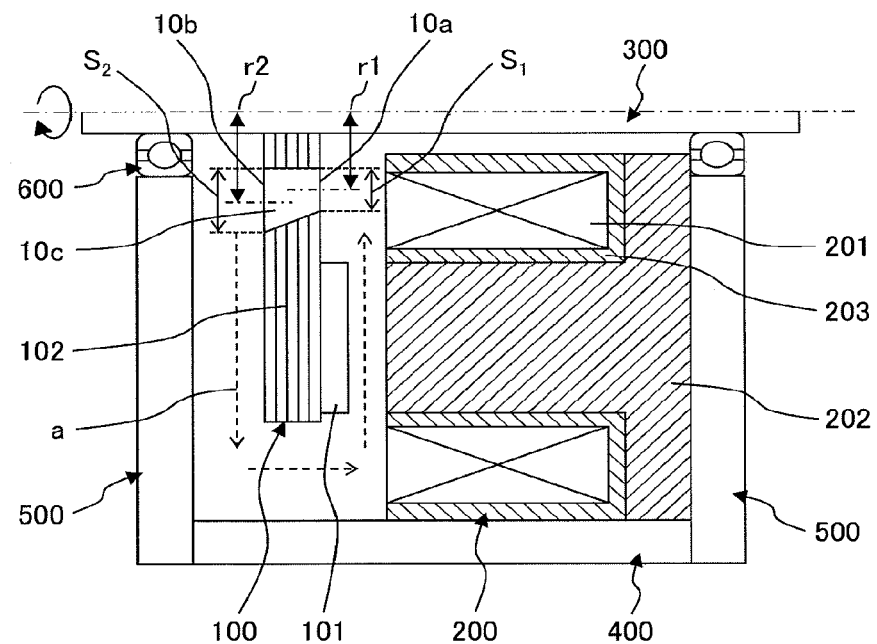
FIG. 1 is a vertical cross-sectional view illustrating a principal portion of an axial gap rotating-electric machine according to a first embodiment (Example 1) of the invention.

Referring now to the drawings, embodiments of the invention will be described in detail. However, the invention is not limited to the embodiments described below, and a variety of modifications or applications are included within the scope of the invention without departing from a technical concept of the invention. In the invention, a plurality of examples are proposed. However, the same reference numerals represent the same components or components having similar functions.

EXAMPLE 1

FIG. 1 is a cross-sectional view illustrating a principal portion of an axial gap rotating-electric machine according to a first embodiment of the invention. In Example 1, a configuration of a one-rotor one-stator axial gap rotating-electric machine is described.

In FIG. 1, the axial gap rotating-electric machine includes a disk-shaped rotor 100, a stator 200 facing thereto via a predetermined air gap, a rotating shaft 300 configured to support the rotor 100 in an inner peripheral portion of the rotor 100, end brackets 500 configured to rotatably hold both ends of the rotating shaft 300 by using a bearing 600, and a housing 400 connected to outer peripheral sides of the end brackets 500 to cover the rotor 100 and the stator 200.

The stator 200 is fixed to the housing 400 on the outer periphery thereof with a bolt or an adhesive synthetic resin, and an inner periphery of the stator 200 faces the rotating shaft 300 with a predetermined clearance therebetween. The stator 200 includes an iron core 202 and a winding coil 201 and the iron core 202 includes a yoke portion and a teeth portion. The winding coil 201 is wound around the teeth portion via an insulative material 203.

The rotor 100 includes a yoke 102, and a flat-plate shaped permanent magnet 101 arranged circumferentially on a surface of the yoke 102, and the permanent magnet 101 is arranged so as to face the teeth portion via a predetermined air gap.

The iron core 202 of the stator 200 may be formed of a lamination of electromagnet steel plates or amorphous foil bands, or a soft magnetic body such as a dust core, the winding coil 201 may be formed of a copper wire or an aluminum wire, and the permanent magnet 101 may be formed of a ferrite magnet or a neodymium magnet.

The characteristic configuration of Example 1 is that the rotor 100 is provided with a differential pressure generating mechanism for circulating internal air, and the configuration will be described below.

In FIG. 1, an opening 10a is provided on one surface of the rotor 100 facing the stator, and an opening 10b is provided on the other surface facing the end bracket 500 in the same manner. The opening 10a and the opening 10b are in fluid communication by a communication channel 10c. In other words, the internal air flows between the opening 10a and the opening 10b through the communication channel 10c.

The opening 10a and the opening 10b both have a circular opening shape, the diameter of the opening 10b is set to be larger than the diameter of the opening 10a, and a surface area S2 of the opening 10b is larger than a surface area S1 of the opening 10a so that a relationship of S1<S2 is satisfied.

Outer peripheral edges of the opening 10a and the opening 10b are arranged to match on the rotating shaft 300 side, so that the shape of the channel which allows passage of the internal air formed by the opening 10a, the opening 10b and the communication channel 10c has a funnel shape in which centers of the opening 10a ad the opening 10b are eccentrically positioned.

A relationship between a first distance r1 between the center of the opening 10a and the center of rotation of the rotating shaft 300 and a second distance r2 between the center of the opening 10*b* and the center of rotation of the rotating shaft 300 have a relationship of r1<r2.

In the axial gap rotating-electric machine of such a configuration, when an AC current is fed to the winding coil 201 using an inverter or an AC power source (not illustrated) an alternating magnetic field is formed on the surface of the teeth portion of the stator 200. By the attraction and the repulsion between the alternating magnetic field and a static magnetic field of the rotor 100 by the permanent magnet 101, the rotor 100 rotates and a torque is generated in the rotating shaft 300.

When the rotor 100 rotates, a differential pressure is generated by the difference between the opening 10*a* formed on one surface of the rotor 100 and the opening 10*b* formed on the other surface of the rotor 100 in peripheral speed. In other words, since the distance from the center of rotation of the rotating shaft 300 to the center of the opening 10*b* is longer than to the center of the opening 10*a*. Therefore, the peripheral speed of the opening 10*b* is faster than that of the opening 10*a*.

Accordingly, the differential pressure expressed by the following expression (1) (the differential pressure generated by an Euler head) is generated between the opening 10*a* and the opening 10*b*.

$$\Delta P = 1/2 \rho \omega^2 (r2^2 - r1^2) \quad (1)$$

where ρ is an internal air density, and ω is an angular speed of the rotor.

Accordingly, a flow of internal air is generated from the opening 10*a* having the center of opening at a shorter distance from the center of rotation of the rotating shaft 300 to the opening 10*b* having the center of opening at a longer distance from the center of rotation of the rotating shaft 300 in the interior of the communication channel 10*c*.

In Example 1, the internal air moves from the opening 10*a* opening on the stator 200 side through the communication channel 10*c* toward the opening 10*b* opening on the end bracket 500 sides. The internal air discharged from the opening 10*b* flows in a space formed between the rotor 100 and the end brackets 500 radially outward as indicated by a broken-line arrow a, then flows in a space formed between the rotor 100 and the housing 400 axially toward the stator, and flows radially inward in a space between the rotor 100 and the winding coil 201 and the teeth portion of the stator 200, and is returned back to the opening 10*a* again. By repeating this movement continuously, the internal air is circulated.

Although the same can apply in Examples described below, the shapes of the opening 10*a* and the opening 10*b* may be a circle, an ellipse, a square, and other shapes, and what is essential is that the openings are formed on both surface sides of the rotor, and have different peripheral speeds so as to generate a differential pressure.

Subsequently, a cooling action of the axial gap rotating-electric machine configured in this manner will be described.

The internal air discharged from the opening 10*b* flows in the space formed between the rotor 100 and the end brackets 500 radially outward and, at this time, a heat exchange is performed with respect to the end brackets 500, whereby the internal air is cooled. Subsequently, the internal air flows in the space formed between the rotor 100 and the housing 400 axially toward the stator. At this time as well, a heat exchange is performed with respect to the housing 400, so that the internal air is further cooled. The internal air is heat-exchanged with the external air and hence is cooled by such an action, so that the temperature is lowered.

In contrast, the internal air lowered in temperature by being cooled flows radially inward in the space between the rotor 100, and the winding coil 201 and the teeth portion of the stator 200. At this time, since the temperature of the internal air is lower than the temperatures of the winding coil 201 and the teeth portion, the internal air acts to draw heat from the winding coil 201 and the teeth portion.

In this manner, heat of the internal air is transferred to the end brackets 500 and the housing 400, is radiated to the external air, and is cooled. The cooled internal air draws heat from the surfaces of the winding coil 201 and the teeth portion when passing therethrough by heat transfer, so that the stator 200 is cooled.

A thermal radiation amount Q caused by the heat transfer flowing from the winding coil 201 and the teeth portion to the internal air is expressed by the following expression (2). In the expression (2), the temperature of the stator 200 is expressed by an average temperature thereof on the basis of the temperatures of the winding coil 201 and the teeth portion.

$$Q = KA(Ts - Ta) \quad (2)$$

where, K is a coefficient of thermal transfer, A is thermal radiating surface area, Ts is a stator surface temperature, and Ta is an internal air temperature. The coefficient of thermal transfer K is a parameter proportional to the flow rate of the internal air.

As is understood from the expression above, when the thermal radiation surface area and the surface temperature of the stator are not changed, it is necessary to increase the coefficient of thermal transfer K and to decrease the internal air temperature in order to increase the thermal radiation amount Q.

In order to do so, it is important to increase the circulation speed of the internal air, and simultaneously, increase the thermal radiation amounts from the end brackets 500 and the housing 400 to decrease the internal air temperature. This is achieved by various methods, and will be apparent from the description given below or other embodiments described later although all the methods cannot be covered.

In Example 1, the magnet is mounted on the yoke. However, it is also possible to provide a constructional material configured to hold the magnet and the yoke separately and form an opening therein. In particular, when a material having a low strength such as a lamination of electromagnetic steel plates or a dust core is used as the yoke, the constructional material is preferably used. The opening for causing the internal air to circulate may be provided in any of the constructional material, the yoke, and the magnet as a matter of course.

The positions of the centers of the opening 10*a* and the opening 10*b*, and the surface areas thereof need to be determined on the basis of the circulating speed of the internal air flowing on the surface of the stator and the radial position of the teeth portion of the stator 200.

The circulating speed of the internal air may be increased by increasing the difference between the first distance r1 and the second distance r2 from the center of rotation of the rotating shaft to the centers of the respective openings. Therefore, it is advantageous to locate the center of the opening 10*a* closer to the center of rotation of the rotating shaft in order to increase the circulating speed of the internal air.

However, the distance r1 to the center of the opening 10*a* is preferably larger than the diameter of the inner periphery of the stator 200. In other words, when the opening 10*a* is positioned inward of the diameter of the inner periphery of the stator 200, the internal air may flow into the space formed between the rotor 100 and the rotating shaft 300 whereby an eddy is generated and acts as draft resistance of the internal air circulation in terms of fluidity.

Since the communication channel 10*c* secures a rotational balance of the rotor 100, two or more of the communication channels 10*c* are preferably provided equidistantly in the circumferential direction. In addition, the openings 10*a* and 10*b* and the communication channel 10*c* preferably have a circular shape in lateral cross section in order to reduce the draft resistance of the circulating internal air, and the inner peripheral surfaces of the communication channel 10*c* are preferably smooth.

According to Example, 1, the internal air used for cooling serves as the differential pressure generating mechanism formed in the rotor 100 and hence the compressing mechanism or the fan for forcedly conveying the air is not necessary. Consequently, the configuration is simplified, and reduction in size of the physical structure may be expected.

In Example 1, since the openings 10*a* and 10*b* and the communication channel 10*c* are formed on the inner peripheral side of the magnet 101 of the rotor 100, effects of reduction in weight and suppression of increase in size of the rotor 100 are also achieved. In other words, when the openings 10*a* and 10*b* and the communication channel 10*c* are formed on the outer peripheral side of the permanent magnet 101 of the rotor 100, increase in the diameter of the rotor 100 is required correspondingly, so that increase in weight or size of the rotor 100 may result.

As described above, according to Example 1, cooling of the stator is achieved by providing the communication channel that connects the first opening formed on one side surface of the rotor of the axial gap rotating-electric machine and the second opening formed on the other side surface of the rotor thereof, and differentiating the first distance from the rotating shaft and the center of the first opening and the second distance from the rotating shaft and the center of the second opening, the differential pressure is generated between the both openings because of the difference in distance to the first opening and the second opening, and the air flow generated by the differential pressure is flowed to the stator in the proximity to the rotor via the communication channel.

Therefore, even though the axial gap rotating-electric machine is of a hermetically closed type, cooling of the stator is achieved with a simple configuration such as forming the communication hole in the rotor. The internal air having used for cooling the stator is subject to a thermal exchange with the external air via the housing, and the circulative cooling is enabled.

EXAMPLE 2

Subsequently, a second embodiment of the invention will be described. Example 2 discloses a configuration of a two-rotor one-stator axial gap rotating-electric machine in which the rotors are arranged on both sides of the one stator.

Figure 2:
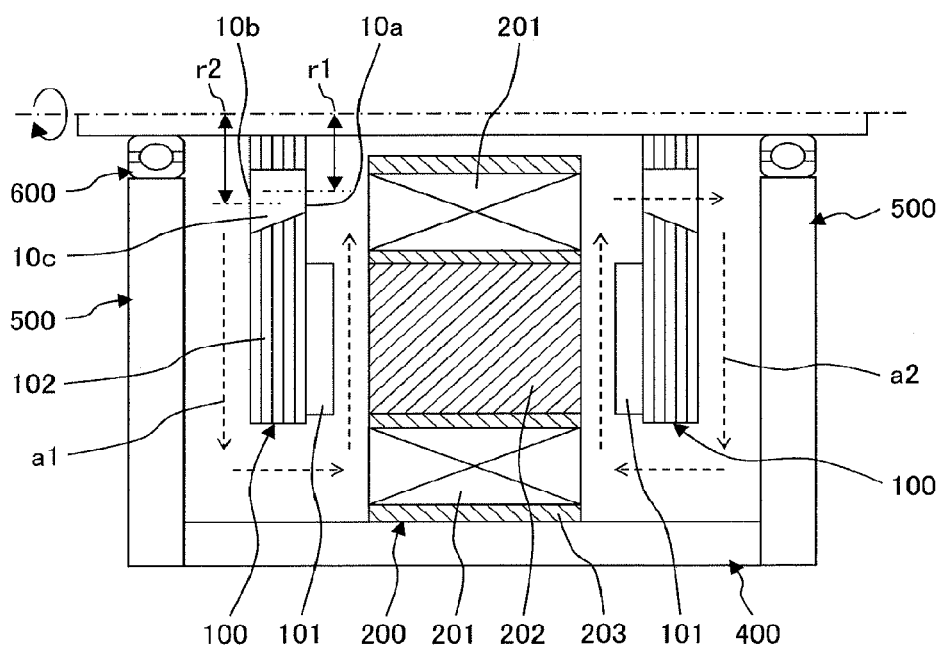
FIG. 2 is a vertical cross-sectional view illustrating a principal portion of an axial gap rotating-electric machine according to a second embodiment (Example 2) of the invention.

The axial gap rotating-electric machine illustrated in FIG. 2 is substantially the same as Example 1 illustrated in FIG. 1, but is different in that the first and second rotors 100 are arranged on both sides of the stator 200.

In FIG. 2, the stator 200 is fixed at an outer peripheral portion thereof to the inner periphery of the housing 400 in the vicinity of a center of the housing 400. Then, the stator 200 is configured to have the winding coil 201 and the iron core 202 existing on both surfaces thereof.

On both sides of the stator 200, the rotors 100 having the same shape are arranged symmetrically with respect to the stator 200. The shape of the rotor 100 is the same as the Example 1 illustrated in FIG. 1, and the circulating state of the internal air has the same configuration.

In this configuration, when the rotating shaft 300 rotates, both of the rotors 100 (hereinafter, referred to as both rotors 100) start to rotate, and a differential pressure is generated by the difference in peripheral speed between the opening 10*a* formed on one surface of each of the both rotors 100 and the opening 10*b* formed on the other surface of each of the both rotors 100. In other words, since the distance from the center of rotation of the rotating shaft 300 to the center of the opening 10*b* is longer than to the center of the opening 10*a*, the peripheral speed of the opening 10*b* is faster than that of the opening 10*a*.

Accordingly, the differential pressure (the differential pressure generated by an Euler head) is generated between the opening 10*a* and the opening 10*b* of each of the both rotors 100. Accordingly, a flow of internal air is generated from the opening 10*a* having the center of opening at a shorter distance from the center of rotation of the rotating shaft 300 to the opening 10*b* having the center of opening at a longer distance from the center of rotation of the rotating shaft 300 in the interior of the communication channel 10*c* of each of the both rotors 100.

In Example 2, the internal air moves from the openings 10*a* opening on the stator 200 sides of the both rotors 100 through the communication channels 10*c* toward the openings 10*b* opening on the end brackets 500 side.

The internal air discharged from the openings 10*b* flows in spaces formed between the both rotors 100 and the end brackets 500 radially outward as indicated by broken-line arrows a1 and a2, then flows in spaces formed between the both rotors 100 and the housing 400 axially toward the stator, further flows in spaces between the both rotors 100 and the winding coil 201 and the iron core 202 of the stator 200 radially inward, and is returned back to the openings 10*a* again. By repeating this movement continuously, the internal air is circulated.

Subsequently, a cooling action of the axial gap rotating-electric machine configured in this manner will be described.

The internal air discharged from the openings 10*b* flows in spaces formed between the rotors 100 and the end brackets 500 radially outward and, at this time, a heat exchange is performed with respect to the end brackets 500, whereby the internal air is cooled. Subsequently, the internal air flows in the spaces formed between the rotors 100 and the housing 400 axially toward the stator. At this time as well, a heat exchange is performed with respect to the housing 400, so that the internal air is further cooled. The internal air is heat-exchanged with the external air and hence is cooled by such an action, so that the temperature is lowered.

In contrast, the internal air lowered in temperature by being cooled flows radially inward in the spaces between the rotors 100, and the winding coil 201 and the teeth portion of the stator 200. At this time, since the temperature of the internal air is lower than the temperatures of the winding coil 201 and the teeth portion, the internal air acts to draw heat from the permanent magnets 101 and the teeth portion.

In this manner, heat of the internal air is transferred to the end brackets 500 and the housing 400, is radiated to the external air, and is cooled. The cooled internal air draws heat from the surfaces of the winding coil 201 and the teeth portion when passing therethrough by heat transfer, so that the stator 200 may be cooled.

In the second embodiment, the action and the effects as described in conjunction with Example 1 are basically achieved. However, since the cooling of the stator 200 is performed by the internal air circulation by the both rotors 100, the cooling effect is doubled from the view point of the stator 200.

In Example 1 and Example 2, an example in which the diameter and the center of the opening 10*a* and the opening 10*b* are differentiated is described. However, a configuration in which the centers of the openings 10a and 10b having the same diameter are differentiated and the both openings 10a and 10b are communicated by an oblique communication channel is also applicable without problem.

In addition, the opening 10a, the opening 10b and the communication channel 10c may be formed by piercing obliquely by a drill or a punch. In view of manufacture, this configuration may be advantageous. In this case, the opening 10a and the opening 10b are ellipsoidal shaped openings elongated toward the center of rotation.

EXAMPLE 3

Subsequently, third embodiment of the invention will be described. Example 3 discloses a configuration of a two-rotor one-stator axial gap rotating-electric machine in which the rotors are arranged on both sides of the one stator.

Figure 3:
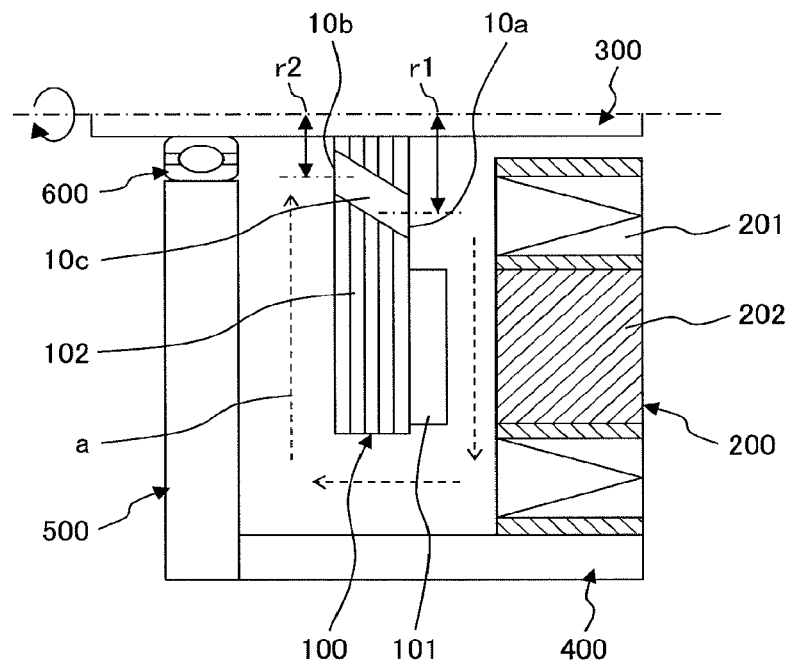
FIG. 3 is a vertical cross-sectional view illustrating a principal portion of an axial gap rotating-electric machine according to a third embodiment (Example 3) of the invention.

FIG. 3 is a cross section of the two-rotor one-stator axial gap rotating-electric machine illustrating a side where one of the rotors is provided. Therefore, the other side on which the other rotor is provided, not illustrated, have the same configuration.

The different point of Example 3 from Examples 1 and 2 illustrated in FIGS. 1 and 2 is that the positional relationship between the opening 10a on one surface of the rotor 100 facing the stator and the opening 10b on the other surface of the rotor 100 facing the end bracket 500 is inverted. In other words, the opening 10a and the opening 10b are in fluid communication by a communication channel 10c, and the internal air is caused to flow from the opening 10b to the opening 10a by the communication channel 10c.

In FIG. 3, the opening 10a is provided on one surface of the rotor 100 facing the stator 200 side, and the opening 10b is provided on the other surface facing the end bracket 500 in the same manner. The opening 10a and the opening 10b are in fluid communication by the communication channel 10c. In other words, the internal air flows between the opening 10a and the opening 10b through the communication channel 10c.

The opening 10a and the opening 10b both have an ellipsoidal shape elongated toward the center of rotation, longer axes and the shorter axes of the opening 10a and the opening 10b are set to be substantially the same, and the surface area S2 of the opening 10b is substantially the same as the surface area S1 of the opening 10a.

The positions of formation of the opening 10a and the opening 10b are different from each other and, specifically, the first distance r1 between the center of opening 10a formed on one surface facing the stator 200 and the center of rotation of the rotating shaft 300 and the second distance r2 between the center of the opening 10b formed on the other surface facing the end bracket 500 and the center of rotation of the rotating shaft 300 have a relationship of r2<r1.

Here, the position of opening of the opening 10a is important, and the opening 10a is opened toward the winding coil 201 positioned on an inner peripheral side of the rotor 100. The reason is that the temperature is higher on the inner peripheral side thereof, and this will be described later.

In other words, the opening 10a and the opening 10b are in communication by the communication channel 10c, and the internal air is caused to flow from the opening 10b toward the opening 10a. In addition, the opening 10a, the opening 10b, and the communication channel 10c are formed in the rotor 100 by being pierced obliquely by a drill. Therefore, the differential pressure generating mechanism in this configuration is very simple in structure, and is easy to manufacture.

In the axial gap rotating-electric machine of this configuration, when the rotor 100 rotates, a differential pressure is generated by the difference between the opening 10a formed on one surface of the rotor 100 and the opening 10b formed on the other surface of the rotor 100 in peripheral speed. In other words, since the distance from the center of rotation of the rotating shaft 300 to the center of the opening 10a is longer than to the center of the opening 10b, the peripheral speed of the opening 10a is faster than that of the opening 10b.

Accordingly, as described in conjunction with Example 1, the differential pressure (the differential pressure generated by an Euler head) is generated between the opening 10a and the opening 10b.

Accordingly, a flow of internal air is generated from the opening 10b having the center of opening at a shorter distance from the center of rotation of the rotating shaft 300 toward the opening 10a having the center of opening at a longer distance from the center of rotation of the rotating shaft 300 in the interior of the communication channel 10c.

In Example 3, the internal air moves from the opening 10b opening on the end bracket 500 side through the communication channel 10c toward the opening 10a opening on the stator 200 side.

The internal air discharged from the opening 10a flows radially outward through the space between the rotor 100, the winding coil 201 and the iron core 202 of the stator 200 as indicated by the broken-line arrow a. At this time, the internal air draws heat from the winding coil 201 and the iron core 202 and hence is increased in temperature. The internal air increased in temperature flows axially in the space formed between the rotor 100 and the housing 400 toward the end bracket side, then flows radially inward in the space between the rotor 100 and the end bracket 500, and returns to the opening 10b again. By repeating this movement continuously, the internal air is circulated.

Subsequently, a cooling action of the axial gap rotating-electric machine configured in this manner will be described.

The internal air discharged from the opening 10a flows toward the winding coil 201 and the iron core 202 positioned on the inner peripheral side of the stator 200. The internal air flowing at this time is heat-exchanged with the external air via the housing 400 or the end bracket 500 in the process of circulation, and hence has the lowest temperature in the circulating internal air.

A temperature distribution viewed in the direction of radius of the stator 200 is higher on the inner peripheral side, and is lower as it goes toward the outer peripheral side due to the thermal radiation by the housing 400. Therefore, the larger the temperature difference between the surface temperature and the internal air temperature of the stator, the larger thermal radiation amount becomes as expressed by the expression (2) given above. Therefore, the opening 10a is formed so as to open toward the inner peripheral side of the stator 200, preferably, toward the winding coil 201 on the inner peripheral side.

The internal air discharged from the opening 10a flows radially outward in the space formed by the rotor 100 and the stator 200, and as described above, since a heat exchange is performed between the internal air and the stator 200 in this process, the temperature of the internal air is high.

Subsequently, the internal air increased in temperature flows axially in the space formed between the rotor 100 and the housing 400 toward the end bracket 500. At this time, the heat exchange is performed with respect to the housing 400, so that the internal air is cooled by the external air via the housing 400.

Furthermore, the internal air flows in the space formed between the rotor 100 and the end bracket 500 radially inward and, in this process as well, the heat exchange is performed with respect to the end bracket 500, whereby the internal air is cooled by the external air via the end bracket 500. The internal air is heat-exchanged with the external air and hence is cooled by such an action, so that the temperature is the lowest. The cooled internal air is fed again to the opening 10*b*, so that the internal air circulation is continued.

In this manner, heat of the internal air is transferred to the end bracket 500 and the housing 400, is radiated to the external air, and is cooled. The cooled internal air draws heat from the surfaces of the winding coil 201 and the stator 200 formed of the iron core 202 when passing therethrough by heat transfer, so that the stator 200 is cooled.

In the third embodiment, the action and the effects as described in conjunction with Example 1 are basically achieved. However, since the internal air cooled by the housing 400 and the end bracket 500 and having the lowest temperature may be blasted onto the inner peripheral portion of the high-temperature stator, the effective cooling of the stator 200 is achieved.

Example 3 may be applied to a configuration of a one-rotor one-stator axial gap rotating-electric machine.

EXAMPLE 4

Subsequently, a fourth embodiment of the invention will be described. Example 4 discloses a modification of Example 3 illustrated in FIG. 3.

The different point of Example 4 from Example 3 illustrated in FIG. 3 is that the surface areas of the opening 10*a* on the one surface of the rotor 100 facing the stator and the opening 10*b* on the other surface thereof facing the end bracket 500 are different, and the shape of the communication channel 10*c* connecting the opening 10*a* and the opening 10*b* is different.

Figure 4:
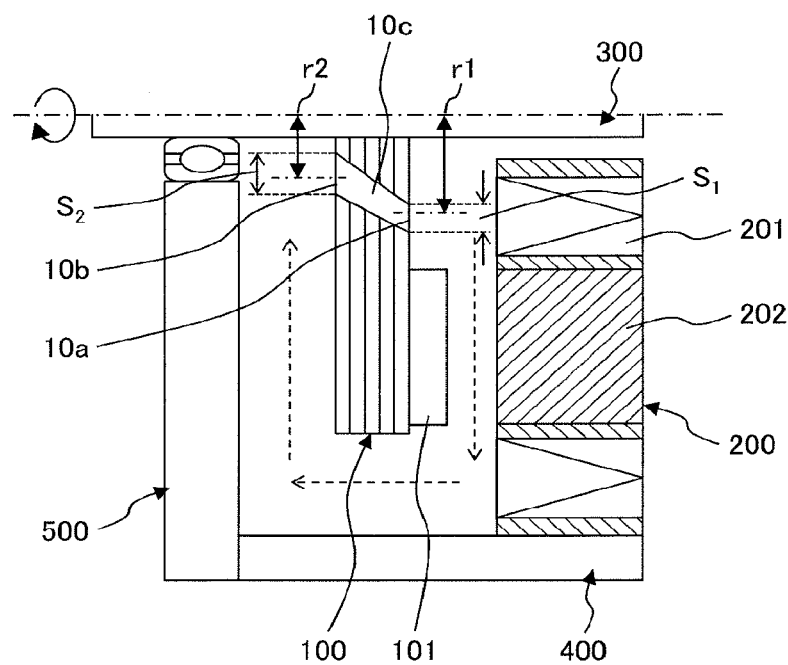
FIG. 4 is a vertical cross-sectional view illustrating a principal portion of an axial gap rotating-electric machine according to a fourth embodiment (Example 4) of the invention.

In FIG. 4, the surface area S1 of the opening 10*a* is formed to be smaller than the surface area S2 of the opening 10*b*, and a relationship of S1<S2 is satisfied. Here, the shapes of the opening 10*a* and the opening 10*b* are a circular shape in Example 4, but may be an ellipse, a square, or other shaped instead of the circle as described in conjunction with Example 1.

The communication channel 10*c* has a channel shape decreasing in diameter and hence in cross-sectional area from the opening 10*b* toward the opening 10*a*, and this may be formed by punching using a punch having, for example, a tapered shape. Accordingly, the opening 10*a* having a smaller surface area, the opening 10*b* having a larger surface area, and the communication channel 10*c* reduced in diameter may advantageously be formed simultaneously.

Since the basic actions and the effects are the same as that illustrated in Example 3, the description is omitted, and the configuration, the action, and the effect of the communication channel 10*c* reduced in diameter will be described.

In FIG. 4, the differential pressure is generated from the reason described in conjunction with Example 3, and the internal air is discharged from the opening 10*b* having the larger surface area to the opening 10*a* having the smaller surface area. At this time, since the communication channel 10*c* is reduced in diameter, the flow speed is increased, and hence the speed of the internal air discharged from the opening 10*a* is accelerated in comparison with the communication channel which is not reduced in diameter.

Therefore, since the speed of the internal air blown out from the opening 10*a* is high, a coefficient of thermal transfer K between the internal air and the surface of the stator 200 expressed by the expression (2) is increased. Since the coefficient of thermal transfer K is a parameter proportional to the flow rate of the internal air, the higher the speed of the internal air, the more the heat of the surface of the stator 200 is effectively drawn.

The cross-sectional area of the communication channel 10*c* is preferably reduced gradually as it goes toward the opening 10*a*, whereby the draft resistance in the communication channel 10*c* is reduced, and hence enhancement of the internal air flow rate is expected.

EXAMPLE 5

Subsequently, a fifth embodiment of the invention will be described. Example 5 discloses a modification of Example 3 illustrated in FIG. 3.

The different point of Example 5 from Example 3 illustrated in FIG. 3 is that one or both of the opening 10*a* of the rotor 100 on one surface facing the stator and the opening 10*b* of the rotor 100 on the other surface facing the end bracket 500 side of the rotor 100 are provided with a distance extended portion.

Since the basic actions and the effects are the same as that illustrated in Example 3, the description is omitted, and the configuration, the action, and the effect of the distance extended portion will be described.

Figure 5:
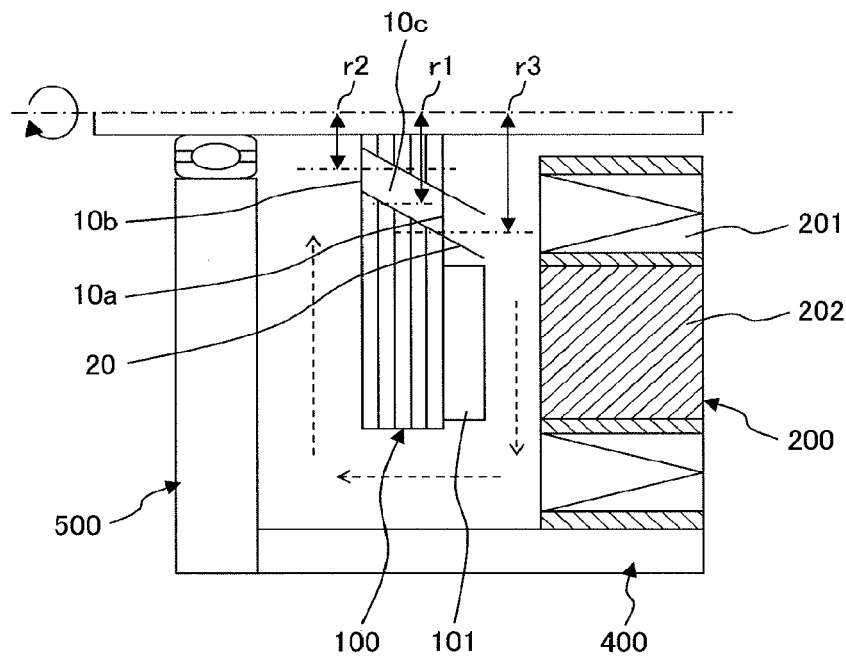
FIG. 5 is a vertical cross-sectional view illustrating a principal portion of an axial gap rotating-electric machine according to a fifth embodiment (Example 5) of the invention.

In Example 5 in FIG. 5, a communication cylinder 20 is provided on the opening 10*a* as the distance extended portion. The communication cylinder 20 is coaxial with the communication channel 10*c*, and extends obliquely downward in the drawing. Therefore, the first distance r2 from the center of rotation of the rotating shaft 300 to the center of an opening of the communication cylinder 20 is larger than the first distance r1 from the center of rotation of the rotating shaft 300 to the center of the opening 10*a* and, consequently, the peripheral speed is increased in comparison with that at the opening 10*a*, so that the differential pressure is increased.

Therefore, since the speed of the internal air blowing out from the communication cylinder 20 is high, the coefficient of thermal transfer K between the internal air and the surface of the stator 200 expressed by the expression (2) is increased. Since the coefficient of thermal transfer K is a parameter proportional to the flow rate of the internal air, the higher the speed of the internal air, the more the heat of the surface of the stator 200 is effectively drawn.

The communication cylinder 20 may be provided either one or both of the opening 10*a* and the opening 10*b*, and may be arranged either radially inside or the radially outside of the opening 10*a* and the opening 10*b* if it is the direction in which the difference in distances of the opening 10*a* and the opening 10*b* from the center of rotation of the rotating shaft 300 are increased.

EXAMPLE 6

Subsequently, a sixth embodiment of the invention will be described. Example 6 discloses a modification of Example 3 illustrated in FIG. 3.

The different point of Example 6 from Example 3 illustrated in FIG. 3 is that an interior blast fan 30 fixed to the rotating shaft 300 is provided in the space between the rotor 100 and the end bracket 500.

Since the basic actions and the effects are the same as those illustrated in Example 3, the description is omitted, and the configuration, the action, and the effect of the interior blast fan 30 will be described.

Figure 6:
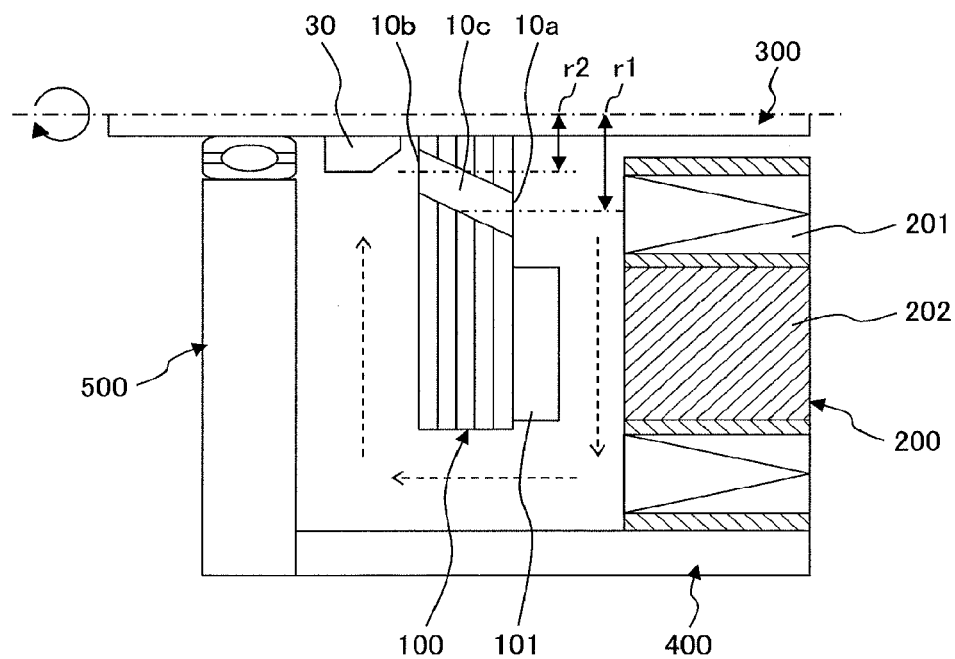
FIG. 6 is a vertical cross-sectional view illustrating a principal portion of an axial gap rotating-electric machine according to a sixth embodiment (Example 6) of the invention.

In FIG. 6, the fan 30 is fixed to the rotating shaft 300, and the interior blast fan 30 has a function that sucks the internal air from the end bracket 500 side to the rotor 100 side, and the internal air acts on the opening 10b of the rotor 100 as a positive pressure.

Therefore, the positive pressure of the internal air flows into the opening 10b as a pressing pressure, the speed of the internal air discharged from the opening 10a via the communication channel 10c is increased.

Therefore, since the speed of the internal air blowing out from the opening 10a is high, the coefficient of thermal transfer K between the internal air and the surface of the stator 200 expressed by the expression (2) is increased. Since the coefficient of thermal transfer K is a parameter proportional to the flow rate of the internal air, the higher the speed of the internal air, the more the heat of the surface of the stator 200 is effectively drawn.

The interior blast fan 30 may be provided in the space between the opening 10a and the stator 200 and, in this case, it is necessary to cause a negative pressure to be applied to the opening 10a.

EXAMPLE 7

A seventh embodiment of the invention will be described. Example 7 discloses a modification of Example 3 illustrated in FIG. 3.

Figure 7:
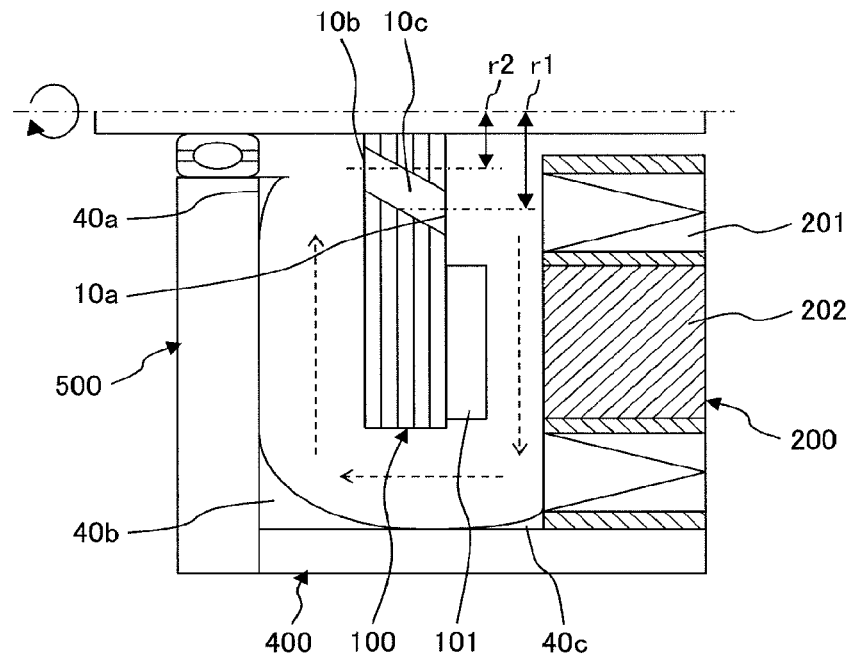
FIG. 7 is a vertical cross-sectional view illustrating a principal portion of an axial gap rotating-electric machine according to a seventh embodiment (Example 7) of the invention.
Figure 8:
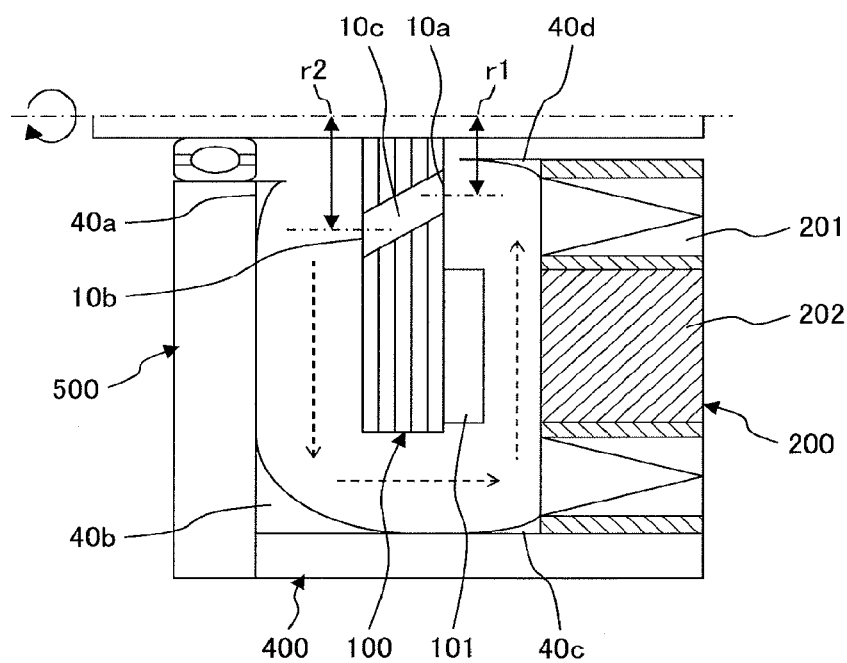
FIG. 8 is a vertical cross-sectional view illustrating a principal portion of an axial gap rotating-electric machine according to a modification of the seventh embodiment of the invention.

In Example 7, the examples illustrated in FIG. 7 and FIG. 8 are proposed and, FIG. 7 is directed to Example 3 illustrated in FIG. 3, and FIG. 8 illustrates the example in which the relationship among the opening 10a, the opening 10b, and the communication channel 10c is inverted from FIG. 7.

In FIG. 7, the surface of the end bracket 500 facing the opening 10b is provided with a first guiding channel member 40a having a shape projecting gradually toward the rotor 100 as it goes radially inward. The first guiding channel member 40a is formed into an annular shape centered at the rotating shaft 300.

A second guiding channel member 40b having an arcuate shape in cross section or a side surface of an obtuse angle is provided at a corner portion formed by the housing 400 and the end bracket 500. The second guiding channel member 40b is formed into an annular shape centered at the rotating shaft 300.

A third guiding channel member 40c having a side surface of an arcuate shape in cross section is formed at a corner portion formed by the stator 200 and the housing 400. The third guiding channel member 40c is formed into an annular shape centered at the rotating shaft 300.

In FIG. 8 as well, the first guiding channel member 40a, the second guiding channel member 40b, and the third guiding channel member 40c are provided. In addition, in FIG. 8, since the direction of flow of the internal air is opposite to that of the example illustrated in FIG. 7, a fourth guiding channel member 40d having a shape projecting toward the rotor 100 gradually as it goes radially inward is provided on the inner peripheral portion of the stator 200. The fourth guiding channel member 40d is formed into an annular shape centered at the rotating shaft 300.

In FIG. 7, the internal air discharged from the opening 10a circulates along a circulating route passing the space between the rotor 100 and the stator 200, the space between the rotor 100 and the housing 400, and the space between the rotor 100 and the end bracket 500, and then returns back to the opening 10b. Since the first guiding channel member 40a, the second guiding channel member 40b, and the third guiding channel member 40c are provided in the circulating route, generation of the local eddy flow at the corner portion is restrained and flows smoothly and, consequently, an effect of increasing the internal air flow rate in the circulating route is expected.

Therefore, since the flow rate of the internal air in the space between the rotor 100 and the stator 200 is increased, the internal air speed on the surface of the stator is increased.

Therefore, since the speed of the internal air blowing out from the opening 10a is high, the coefficient of thermal transfer K between the internal air and the surface of the stator 200 expressed by the expression (2) is increased. Since the coefficient of thermal transfer K is a parameter proportional to the flow rate of the internal air, the higher the speed of the internal air, the more the heat of the surface of the stator 200 is effectively drawn.

In the same manner, in the example illustrated in FIG. 8 as well, since the first guiding channel member 40a, the second guiding channel member 40b, the third guiding channel member 40c, and the fourth guiding channel member 40d are provided in the circulating route, generation of the local eddy flow at the corner portion is restrained, and an effect of increasing the internal air flow rate in the circulating route is expected.

Therefore, since the flow rate of the internal air in the space between the rotor 100 and the stator 200 is increased, the internal air speed on the surface of the stator is increased.

Therefore, since the speed of the internal air blowing out from the opening 10a is high, the coefficient of thermal transfer K between the internal air and the surface of the stator 200 expressed by the expression (2) is increased. Since the coefficient of thermal transfer K is a parameter proportional to the flow rate of the internal air, the higher the speed of the internal air, the more the heat of the surface of the stator 200 is effectively drawn.

In the examples illustrated in FIG. 7 and FIG. 8, examples in which annular guiding channel members are arranged at three positions or at four positions are illustrated. However, the guiding channel members may be omitted at positions where not many eddies are generated. The effect of improving the cooling effect of the stator is achieved by using at least one guiding channel member.

EXAMPLE 8

An eighth embodiment of the invention will be described. Example 8 discloses a modification of Example 3 illustrated in FIG. 3.

The different point of Example 8 from Example 3 illustrated in FIG. 3 is that heat exchange fins for accelerating heat exchange are provided on an inner peripheral surface of the housing 400 and on an inner peripheral surface of the end bracket 500.

Since the basic actions and effects are the same as that illustrated in Example 3, the description is omitted, and the configuration, the action, and the effect of the heat exchange fins will be described.

Figure 9:
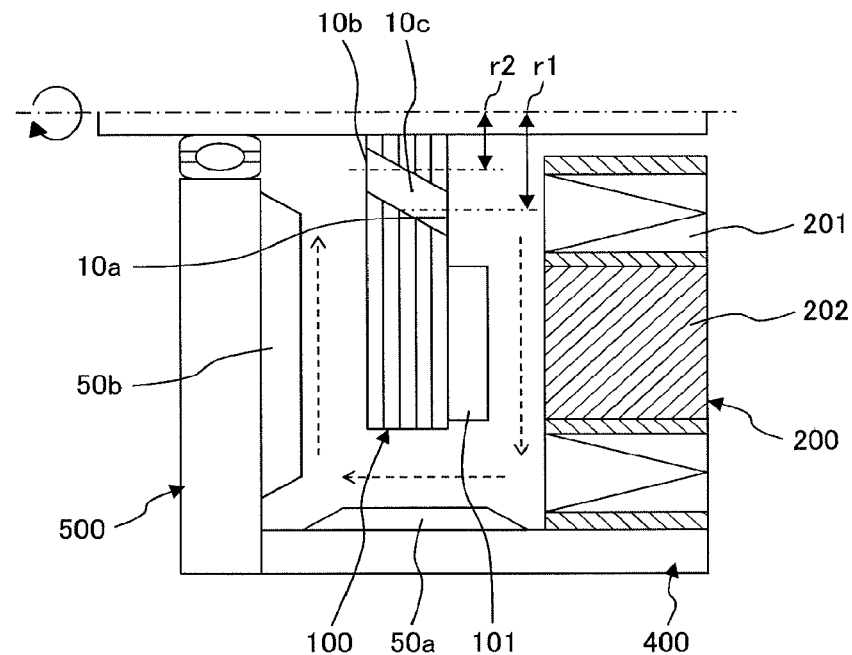
FIG. 9 is a vertical cross-sectional view illustrating a principal portion of an axial gap rotating-electric machine according to an eighth embodiment (Example 8) of the invention.

In FIG. 9, heat exchange fins 50a projecting inward and extending in parallel with the flow of the internal air are formed on the inner peripheral surface of the housing 400 facing the rotor 100. Radial heat exchange fins 50b extending toward the center of rotation are formed on the inner peripheral surface of the end bracket 500 facing the rotor 100. The heat exchange fins 50b formed on the end bracket 500 may extend in parallel along the flow of the internal air instead of extending radially.

The internal air that has drawn the heat from the stator 200 comes into contact with the heat exchange fins 50a and 50b, and at this time the heat exchange is performed, and the heat is radiated to the external air from the housing 400 and the end bracket 500. In this manner, the surface area with which the internal air come into contact is increased by the heat exchange fins 50a and 50b, so that the efficiency of the thermal exchange is improved. Accordingly, the temperature of the internal air may be lowered.

Therefore, the larger the temperature difference between the surface temperature and the internal air temperature of the stator, the larger thermal radiation amount becomes as expressed by the expression (2) given above. Therefore, the heat on the surface of the stator 200 may be drawn effectively by decreasing the temperature of the internal air.

In Example 8, an example in which the heat exchange fins are provided on both of the housing 400 and the end bracket 500 has been described. However, the improvement of the thermal radiation amount of the stator is possible irrespective of whether on the housing 400 or on the end bracket 500.

EXAMPLE 9

A ninth embodiment of the invention will be described. Example 9 discloses a modification of Example 3 illustrated in FIG. 3.

The different point of Example 9 from Example 3 illustrated in FIG. 3 is that heat exchange fins for accelerating heat exchange are provided on an outer peripheral surface of the housing 400 and on an outer peripheral surface of the end bracket 500, and an external blast fan is provided on the outside of the end bracket 500 so that the heat exchange fins are forcedly cooled by the external air.

Since the basic actions and the effects are the same as that illustrated in Example 3, the description is omitted, and the configuration, the action, and the effect of the heat exchange fins and the external blast fan will be described.

Figure 10:
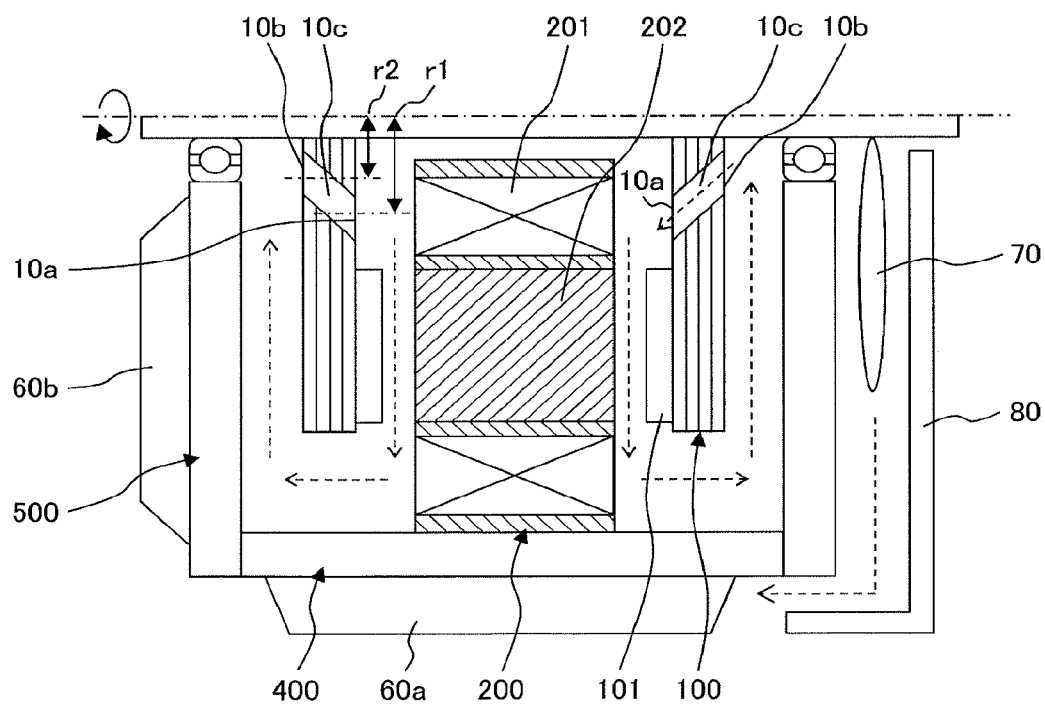
FIG. 10 is a vertical cross-sectional view illustrating a principal portion of an axial gap rotating-electric machine according to a ninth embodiment (Example 9) of the invention.

In FIG. 10, heat exchange fins 60a are formed on the entire outer peripheral surface or part of the outer peripheral surface of the housing 400 axially in parallel to the rotating shaft 300 so as to project outward. Radial heat exchange fins 60b projecting outward and extending toward the center of rotation is formed on the outer peripheral surface of the end bracket 500. The heat exchange fins 60b formed on the end bracket 500 may extend in parallel toward the center instead of extending radially.

In the drawing, a blast fan 70 is provided on the outside of the end bracket 500 on the right side, and the blast fan 70 is fixed to the rotating shaft 300. Therefore, the external blast fan is rotated synchronously with the rotating shaft 300, and is operated so as to transfer the external air sucked from the inner peripheral side to the outer peripheral side of the external blast fan 70.

On the outside of the external blast fan 70, an external air guide member that causes the external air transferred from the external blast fan 70 to flow toward the heat exchange fins 60a formed on the housing 400, here, a cover 80, is provided.

As described above, the internal air circulating in the space surrounded by the stator 200, the housing 400 and the end bracket 500 is heat-exchanged with the external air by the housing 400 and the end bracket 500. Example 9 is configured to accelerate the heat exchange with the external air.

Since the surface area used for the heat exchange between the housing 400 and the end bracket 500 is increased by the heat exchange fin 60b formed on the outer peripheral surfaces of the housing 400 and the end bracket 500, the thermal radiation amount to the external air is increased, and the improvement of the cooling efficiency of the internal air may be improved. In addition, the external air flow formed by the external blast fan 70 flows along the outside air guiding cover 80 to the outer peripheral surface of the housing 400 along the axial direction. Accordingly, the amount of thermal transfer between the housing 400 and the external air is further increased, whereby the temperature of the internal air may be lowered.

Therefore, the larger the temperature difference between the surface temperature and the internal air temperature of the stator, the larger thermal radiation amount becomes as expressed by the expression (2) given above. Therefore, the heat on the surface of the stator 200 may be drawn effectively by decreasing the temperature of the internal air.

Although the fins 60a and 60b of the housing 400 and the end bracket 500 and the external blast fan 70 provided with the outside air guiding cover 80 may be used independently, the combination of the heat exchange fins 60a of the housing 400 and the external blast fan 70 provided with the outside air guiding cover 80 is a suitable combination for manufacturing the actual product.

Although the invention has been described independently by example, it is needless to say that a combination of some of the examples is also applicable.

In this manner, according to the invention, the differential pressure is generated between the first opening and the second opening provided in the rotor by the difference of the distances from the center of rotation of the rotating shaft to the first opening and the second opening provided in the rotor, a flow of air is generated by the differential pressure via the communication channel from one surface or the other surface of the rotor to the other surface or the one surface, whereby the stator in proximity to the rotor may be cooled.

Therefore, even though the axial gap rotating-electric machine is of a hermetically-closed type, cooling of the stator is achieved with a simple configuration such as forming the communication channel in the rotor.

What is claimed is:

1. An axial gap rotating-electric machine comprising:
a stator provided with an iron core and a winding coil;
a rotor provided with a magnet and a yoke facing to the stator via a predetermined air gap;
a rotating shaft to which the rotor is fixed and configured to rotate together with the rotor;
a housing to which an outer periphery of the stator is fixed and configured to store the rotor;
an end bracket fixed to the housing and configured to cover the axial direction of the housing;
a first opening formed on one side surface of the rotor at a position at a predetermined first distance from the center of rotation of the rotating shaft;
a second opening formed on the other side surface of the rotor at a position at a second distance different from the first distance; and
a communication channel provided on the rotor and configured to circulate an internal air by communicating the first opening and the second opening.

2. The axial gap rotating-electric machine according to claim 1, wherein
a first rotor and a second rotor are arranged on both sides of the stator, and the both rotors are each provided with the first opening, the second opening, and the communication channel.

3. The axial gap rotating-electric machine according to claim 1, wherein
the first opening is formed on one surface of the rotor facing the stator, and the second opening is formed on the other surface of the rotor facing the end bracket, and the first distance is smaller than the second distance.

4. The axial gap rotating-electric machine according to claim 1, wherein the first opening is formed on one surface of the rotor facing the stator, and the second opening is formed on the other surface of the rotor facing the end bracket, and the second distance is smaller than the first distance.

5. The axial gap rotating-electric machine according to claim 3, wherein
the first opening and the second opening are formed between the rotating shaft and the magnet.

6. The axial gap rotating-electric machine according to claim 3, wherein
the first opening and the second opening have substantially the same surface area.

7. The axial gap rotating-electric machine according to claim 4, wherein
the second opening is larger than the first opening in surface area, and the communication channel is gradually reduced in cross-sectional area from the second opening toward the first opening.

8. The axial gap rotating-electric machine according to claim 5, wherein
the first opening and the second opening are arranged equidistantly in the circumferential direction on both surfaces of the rotor.

9. The axial gap rotating-electric machine according to claim 5, wherein
one or both of the first opening and the second opening are provided with a channel extending portion extending the length of the communication channel.

10. The axial gap rotating-electric machine according to claim 1, wherein
a fan configured to increase the speed of the internal air blasted from the first opening or the second opening is provided on the rotating shaft.

11. The axial gap rotating-electric machine according to claim 10, wherein
the fan is provided in the vicinity of the first opening or the second opening formed on the rotor rotating at a lower peripheral speed.

12. The axial gap rotating-electric machine according to claim 1, wherein
an annular shaped guide channel member configured to smoothen the flow of the internal air is provided at one corner portion of at least one of portions of the stator, the housing and the end bracket where the internal air flows.

13. The axial gap rotating-electric machine according to claim 12, wherein
the cross-sectional shape of the portion of the annular guide channel member where the internal air flows is an arc shape or an obtuse angle.

14. The axial gap rotating-electric machine according to claim 1, wherein
heat exchange fins configured to accelerate the heat exchange with the internal air is formed on an inner periphery or inner peripheries of one or both of the housing and the end bracket.

15. The axial gap rotating-electric machine according to claim 13, wherein
the heat exchange fins are formed into a shape extending along the flow of the internal air.

16. The axial gap rotating-electric machine according to claim 1, wherein
heat exchange fins configured to accelerate the heat exchange with external air are formed on an outer periphery or outer peripheries of one or both of the housing and the end bracket.

17. The axial gap rotating-electric machine according to claim 15, wherein
an external air supply unit configured to forcedly flow the external air to the heat exchange fins formed on the outer periphery of the housing.

18. The axial gap rotating-electric machine according to claim 16, wherein
the external air supply unit includes a blast fan fixed to the rotating shaft and an external air guide member configured to guide the external air from the blast fan to the heat exchange fins.

19. The axial gap rotating-electric machine according to claim 4, wherein
the first opening and the second opening are formed between the rotating shaft and the magnet.

20. The axial gap rotating-electric machine according to claim 4, wherein the first opening and the second opening have substantially the same surface area.

* * * * *